United States Patent
Eddins et al.

(10) Patent No.: US 12,437,226 B2
(45) Date of Patent: Oct. 7, 2025

(54) PROBABALISTIC AMPLIFICATION AND ATTENUATION OF QUANTUM ERRORS USING A SINGLE DATASET

(71) Applicant: International Business Machines Corporation, Armonk, NY (US)

(72) Inventors: Andrew Eddins, Washington, DC (US); Ewout van den Berg, Bronxville, NY (US); Youngseok Kim, Upper Saddle River, NJ (US); Paul Kristan Temme, Ossining, NY (US); Abhinav Kandala, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 54 days.

(21) Appl. No.: 18/512,678

(22) Filed: Nov. 17, 2023

(65) Prior Publication Data

US 2025/0165839 A1    May 22, 2025

(51) Int. Cl.
*G06N 10/70*    (2022.01)
*G06N 10/60*    (2022.01)

(52) U.S. Cl.
CPC .............. *G06N 10/70* (2022.01); *G06N 10/60* (2022.01)

(58) Field of Classification Search
CPC .............................. G06N 10/70; G06N 10/60
See application file for complete search history.

(56) References Cited

FOREIGN PATENT DOCUMENTS

| CA | 3158890 A1 | * | 5/2021 | ............. G06N 10/00 |
| CN | 112529194 A | | 3/2021 | |

OTHER PUBLICATIONS

Kun Wang, Yu-Ao Chen, Xin Wang; Measurement Error Mitigation via Truncated Neumann Series; arXiv:2103.13856 [quant-ph]; Mar. 25, 2021 (Year: 2021).*

Li, et al. "Efficient variational quantum simulator incorporating active error minimisation" arXiv:1611.09301v5 [quant-ph] Jun. 19, 2017, 14 pages.

Temme, et al. "Error mitigation for short-depth quantum circuits" arXiv:1612.02058v3 [quant-ph] Nov. 6, 2017, 15 pages.

Mari, et al. "Extending quantum probabilistic error cancellation by noise scaling" arXiv:2108.02237v2 [quant-ph] Nov. 12, 2021, 14 pages.

(Continued)

*Primary Examiner* — Joseph D Torres
(74) *Attorney, Agent, or Firm* — Amin, Turocy & Watson, LLP

(57) ABSTRACT

A system comprises a memory that stores and a processor that executes computer executable components stored in the memory, wherein the computer executable components comprise an execution component that directs execution, employing a quantum processor, of an error mitigation set of quantum circuits that were noise-adjusted by employing noise scaling, and an evaluation component that evaluates, at an evaluation, results of the execution of the error mitigation set of quantum circuits, wherein the evaluation comprises a first generation of a first average expectation value corresponding to a noise-attenuated result of the execution, and wherein the evaluation further comprises a second generation of a second average expectation value corresponding to a noise-amplified result of the same execution.

20 Claims, 10 Drawing Sheets

(56) References Cited

OTHER PUBLICATIONS

Van Den Berg, et al. "Probabilistic error cancellation with sparse Pauli-Lindblad models on noisy quantum processors" dearXiv:2201.09866v2 [quant-ph] Jun. 23, 2022, 29 pages.
Ferracin, et al. "Efficiently improving the performance of noisy quantum computers" arXiv:2201.10672v2 [quant-ph] Jul. 19, 2022, 20 pages.
McDonough, et al. "Automated quantum error mitigation based on probabilistic error reduction" arXiv:2210.08611v1 [quant-ph] Oct. 16, 2022, 11 pages.
Kim, et al. "Evidence for the utility of quantum computing before fault tolerance" Nature, vol. 618, Jun. 15, 2023, 8 pages.

* cited by examiner $$\langle O \rangle_{G_0} = \frac{N_+\langle O \rangle_+ - N_-\langle O \rangle_-}{N_+ + N_-}$$

$$\langle O \rangle_{2-G_0} = \frac{N_+\langle O \rangle_+ + N_-\langle O \rangle_-}{N_+ + N_-}$$

FIG. 6

PROBABILISTIC AMPLIFICATION AND ATTENUATION OF QUANTUM ERRORS USING A SINGLE DATASET

BACKGROUND

In quantum computing systems, execution of a quantum circuit can comprise the application of a series of quantum gates. Due to hardware and/or software aspects, some gates can be applied imperfectly, resulting in measurement outcomes being incorrect and/or having error attributed thereto. In one or more cases, error can be due to experimental imperfections such as miscalibration and/or undesired interactions between the quantum computer and the environment.

SUMMARY

The following presents a summary to provide a basic understanding of one or more embodiments described herein. This summary is not intended to identify key or critical elements, and/or to delineate scope of particular embodiments or scope of claims. Its sole purpose is to present concepts in a simplified form as a prelude to the more detailed description that is presented later. In one or more embodiments, systems, computer-implemented methods, apparatuses and/or computer program products described herein can provide a process for error mitigation by generating noise-attenuated and noise-amplified expectation value results from a same set of quantum circuits.

In accordance with an embodiment, a system can comprise a memory that stores computer executable components; and a processor that executes the computer executable components stored in the memory, wherein the computer executable components comprise: an execution component that directs execution, employing a quantum processor, of an error mitigation set of quantum circuits that were noise-adjusted by employing noise scaling; and an evaluation component that evaluates, at an evaluation, results of the execution of the error mitigation set of quantum circuits, wherein the evaluation comprises a first generation of a first average expectation value corresponding to a noise-attenuated result of the execution, and wherein the evaluation further comprises a second generation of a second average expectation value corresponding to a noise-amplified result of the same execution.

In accordance with another embodiment, a computer-implemented method can comprise directing, by a system operatively coupled to a processor, execution, employing a quantum processor, of an error mitigation set of quantum circuits that were noise-adjusted by employing noise scaling; and evaluating, by the system, results of the execution of the error mitigation set of quantum circuits, wherein the evaluating comprises a first generation of a first average expectation value corresponding to a noise-attenuated result of the execution, and wherein the evaluating comprises a second generation of a second average expectation value corresponding to a noise-amplified result of the same execution.

In accordance with still another embodiment, a computer program product facilitating a process to generate noise-attenuated and noise-amplified expectation value results from a same error mitigation set of quantum circuits, the computer program product comprising a computer readable storage medium having program instructions embodied therewith, the program instructions executable by a processor to cause the processor to: direct, by the processor, execution, employing a quantum processor, of an error mitigation set of quantum circuits that were noise-adjusted by employing noise scaling; and evaluate, by the processor, results of the execution of the error mitigation set of quantum circuits, wherein the evaluating comprises a first generation of a first average expectation value corresponding to a noise-attenuated result of the execution, and wherein the evaluating comprises a second generation of a second average expectation value corresponding to a noise-amplified result of the same execution.

A benefit of the system, computer-implemented method and/or computer program product can be use of a same set of shots, a same set of data, and/or a same set of quantum circuit executions resulting from the data for determining both an error-attenuated expectation value result and an error-amplified expectation value result from the data. In comparison to existing frameworks, this can result in reduction in the sampling cost for determination of both the error-attenuated expectation value result and the error-amplified expectation value result. As used herein, the term "sampling cost" can refer to the repeat execution of a quantum circuit, or a variation thereof.

Another benefit of the system, computer-implemented method and/or computer program product can be an ability to use the complementary estimate, the other of the error-attenuated expectation value result and the error-amplified expectation value result, to improve subsequent performance of zero-noise extrapolation (ZNE). For example, a two-parameter exponential fit model $f(G)=Ae^{-kG}$, with fit parameters A and k, as commonly used for ZNE, cannot be fit to a single expectation value result estimate, such as $\langle O \rangle_G$, but can be fit to a pair of estimates, such as $\{\langle O \rangle_G, \langle O \rangle_{2-G}\}$, where G is a noise gain factor. As a result, performance of ZNE can then provide an improved estimate, $f(0)$, of an ideal expectation value.

DESCRIPTION OF THE DRAWINGS

FIG. 6 illustrates a flow diagram of processes that can be performed by the non-limiting system of FIG. 2, in accordance with one or more embodiments described herein.

DETAILED DESCRIPTION

Figure 1:
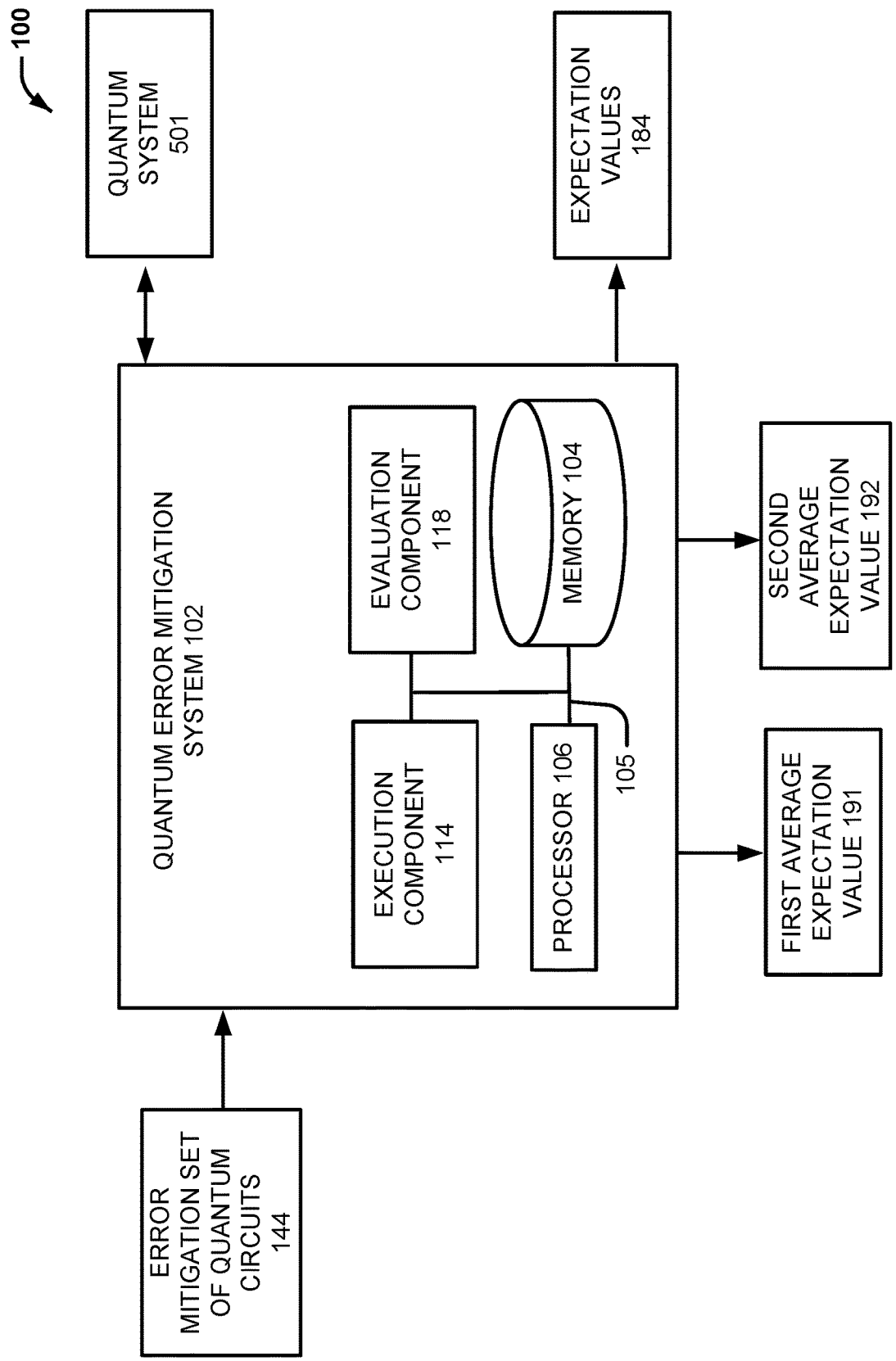
FIG. 1 illustrates a block diagram of an example, non-limiting system that can provide a process to provide an error mitigated estimate of a true expectation value, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In practice, many quantum gates cannot be applied perfectly on quantum computers. That is, quantum computation can involve a set of three steps: (I) initializing qubits in some desired state, (II) applying a series of quantum logic gates, each of which typically acts on one or more qubits, and (III) measuring the qubits. Generally, none of these steps can be implemented perfectly on current quantum computers. Rather, each step is therefore said to be noisy, and the imperfections are often called "noise" or "errors." Some of the most damaging errors (i.e., those which can most severely limit performance) in current quantum computers can be those exhibited on the two-qubit gates.

As used herein, noise can refer to noise attributable to the discrete and/or probabilistic natures of quantum interactions. As an example, noise in two-qubit gates can be a limiting source of error in existing quantum computers.

Quantum error mitigation (QEM) techniques can be employed to reduce the impact of this noise, such as of these two-qubit gate errors. These QEM techniques comprise a broad class of techniques that reduce the overall effect of errors on the result of a quantum-classical program (e.g. a quantum circuit). QEM is most commonly used to improve the accuracy of estimates of properties (e.g. expectation values) of a quantum state produced by a quantum circuit. Typically an original program is executed in several different configurations, the results of which can be classically combined in a way that improves accuracy at the cost of precision. The precision can then be recovered by running the quantum circuit additional times. This increase in total run time is known as the sampling cost of the mitigation scheme. QEM may be distinguished from quantum error correction techniques (e.g. surface code) and quantum error suppression techniques (e.g. dynamical decoupling).

That is, as used herein, error mitigation, or quantum error mitigation, refers to a technique that reduces an effect of errors, such as hardware errors. Such error mitigation techniques can come at a sampling cost. As noted above, the term "sampling cost" can refer to the repeat execution of a quantum circuit, or a variation thereof. To use these error mitigation techniques, noisy gates of the quantum circuit are to first be characterized. Based on the noise characterization, the various error mitigation techniques can be employed.

In one or more embodiments, more than one error mitigation technique can be employed to obtain varying results, such as varying expectation value results, or varying average expectation value results. These varying results can be employed to determine an error mitigated true expectation value of a quantum circuit, such as by fitting the varying results to a suitable function, such as a noise gain function.

One error mitigation technique is zero-noise extrapolation (ZNE). In ZNE, the error rate is scaled by a noise gain factor G, the circuit is run at several values of G to obtain a result $\langle O \rangle$ for each G, and the results are used to extrapolate to G=0 to estimate the ideal, noise-free result $\langle O \rangle_{G=0}$. Including more G values can help provide a more robust result. That is, including more G values can improve the quality of this extrapolation, which is often performed by a least-squares fit of the set of results to a few-parameter model function. G can be varied by one of several methods, including realization of noise-amplified results (G>1) by the probabilistic insertion of errors according to a suitable noise model.

Another error mitigation technique is probabilistic error cancellation (PEC). PEC provides a means of controllably lowering the effective error rate (G<1).

ZNE can be performed using a combination of noise-amplified (G>1) and noise-attenuated (G<1) results, the latter obtained via PEC. In existing frameworks, these multiple results can be determined based on completely different sets of data, resulting from different sets of error mitigation quantum circuits, and different sets of executions (e.g., at a quantum computer) of those different sets of error mitigation quantum circuits. That is, in existing frameworks, multiple data sets are needed to obtain at least a pair of expectation value results for providing suitable fitting to a suitable noise gain function. That is, use of a single data point alone cannot allow for an accurate fitting process.

However, sampling cost to prepare each of these expectation value results of the pair of expectation value results is high in aggregation, and uses considerable resources, including, but not limited to, quantum processor computing time, classical computing time, energy, labor, bandwidth, power, etc.

Accordingly, to account for one or more of these deficiencies of existing quantum error mitigation frameworks, one or more embodiments described herein can provide for an automatic quantum error mitigation framework that can estimate both a noise-attenuated expectation value result and a noise-amplified expectation value result, both based on probabilistic insertion of errors as in PEC, from a same set of data. That is, both the noise-attenuated expectation value result and the noise-amplified expectation value result can be obtained, by the one or more embodiments described herein, from a same set of error mitigation quantum circuits, and a same set of executions (e.g., at a quantum computer) of that set.

As such, the one or more embodiments herein can estimate the result at noise gain G<1, and the same data set can be analyzed once more to obtain additionally an estimate of the result at noise gain 2-G (or vice versa). Put another way, when PEC is used to obtain an estimate $\langle O \rangle_G$ of observable O at noise gain G<1, the one or more embodiments described herein further can provide a complementary estimate $\langle O \rangle_{2-G}$ at no additional sampling cost.

Order of performance of these results can be swapped and/or completed at least partially in parallel with one another. The two estimates together can then be used to improve the performance of ZNE, at no additional sampling cost (e.g., at a negation of additional sampling cost for estimating the second result).

As used herein, the term "data" can comprise metadata.

As used herein, the terms "entity," "requesting entity," and "user entity" can refer to a machine, device, component, hardware, software, smart device, party, organization, individual and/or human.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein.

Figure 2:
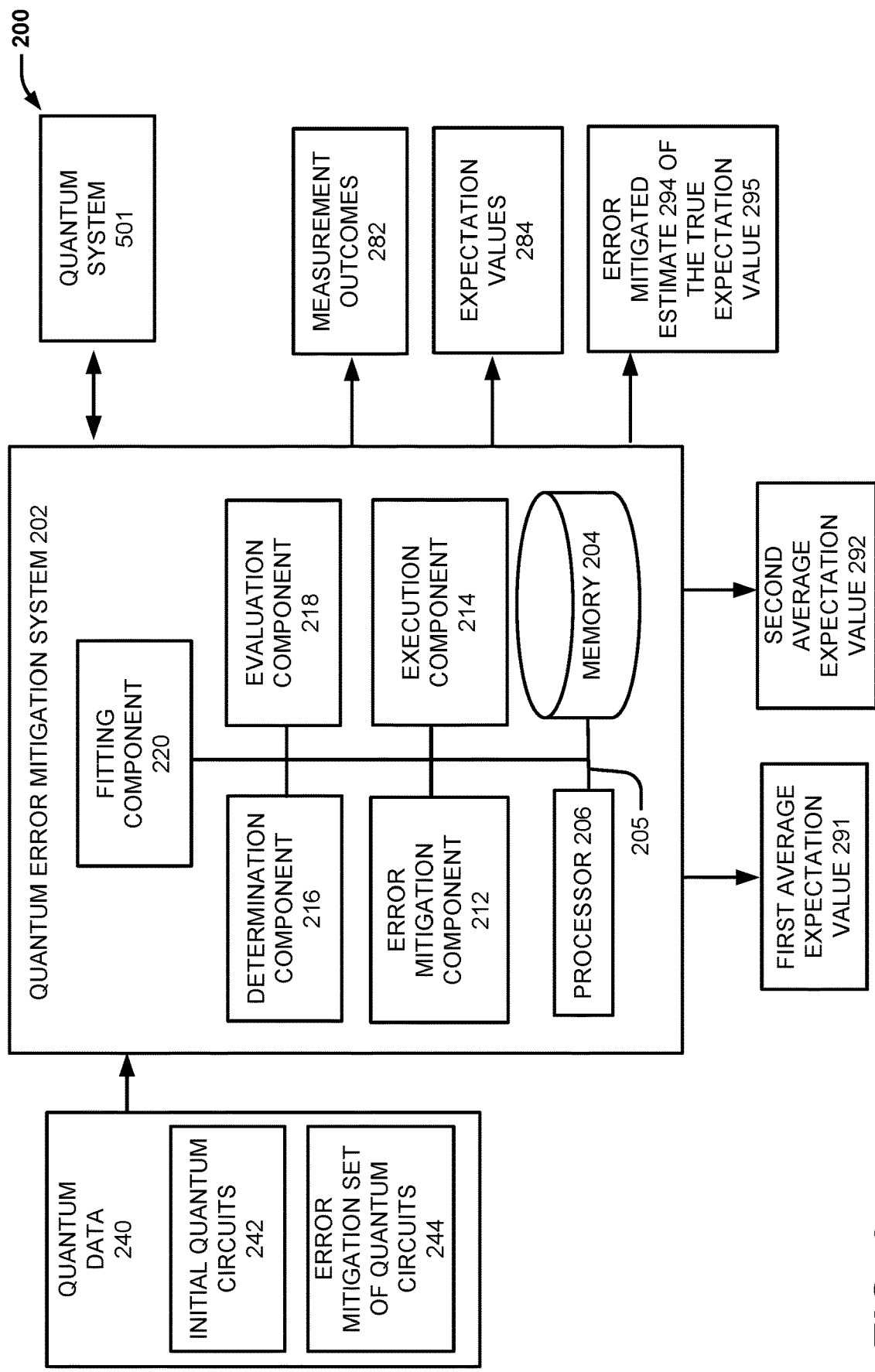
FIG. 2 illustrates a block diagram of another example, non-limiting system that can provide a process to provide an error mitigated estimate of a true expectation value, in accordance with one or more embodiments described herein.
Figure 10:
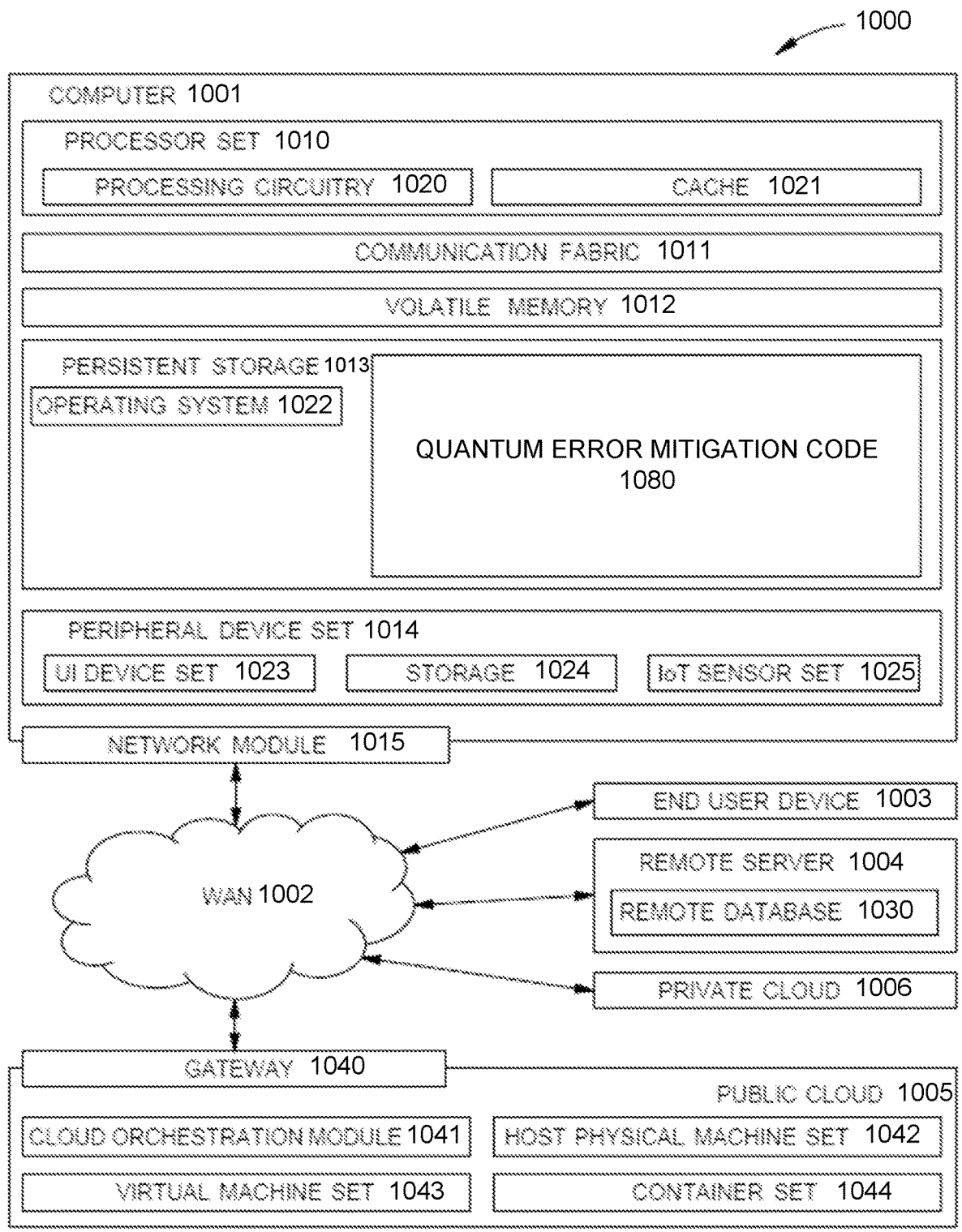
FIG. 10 illustrates a block diagram of an example, non-limiting, computer environment in accordance with one or more embodiments described herein.

For example, in one or more embodiments, the non-limiting systems 100 and/or 200 illustrated at FIGS. 1 and 2, and/or systems thereof, can further comprise one or more computer and/or computing-based elements described herein with reference to a computing environment, such as the computing environment 1000 illustrated at FIG. 10. In one or more described embodiments, computer and/or computing-based elements can be used in connection with implementing one or more of the systems, devices, components and/or computer-implemented operations shown and/or described in connection with FIGS. 1 and/or 2 and/or with one or more other figures described herein.

Figure 5:
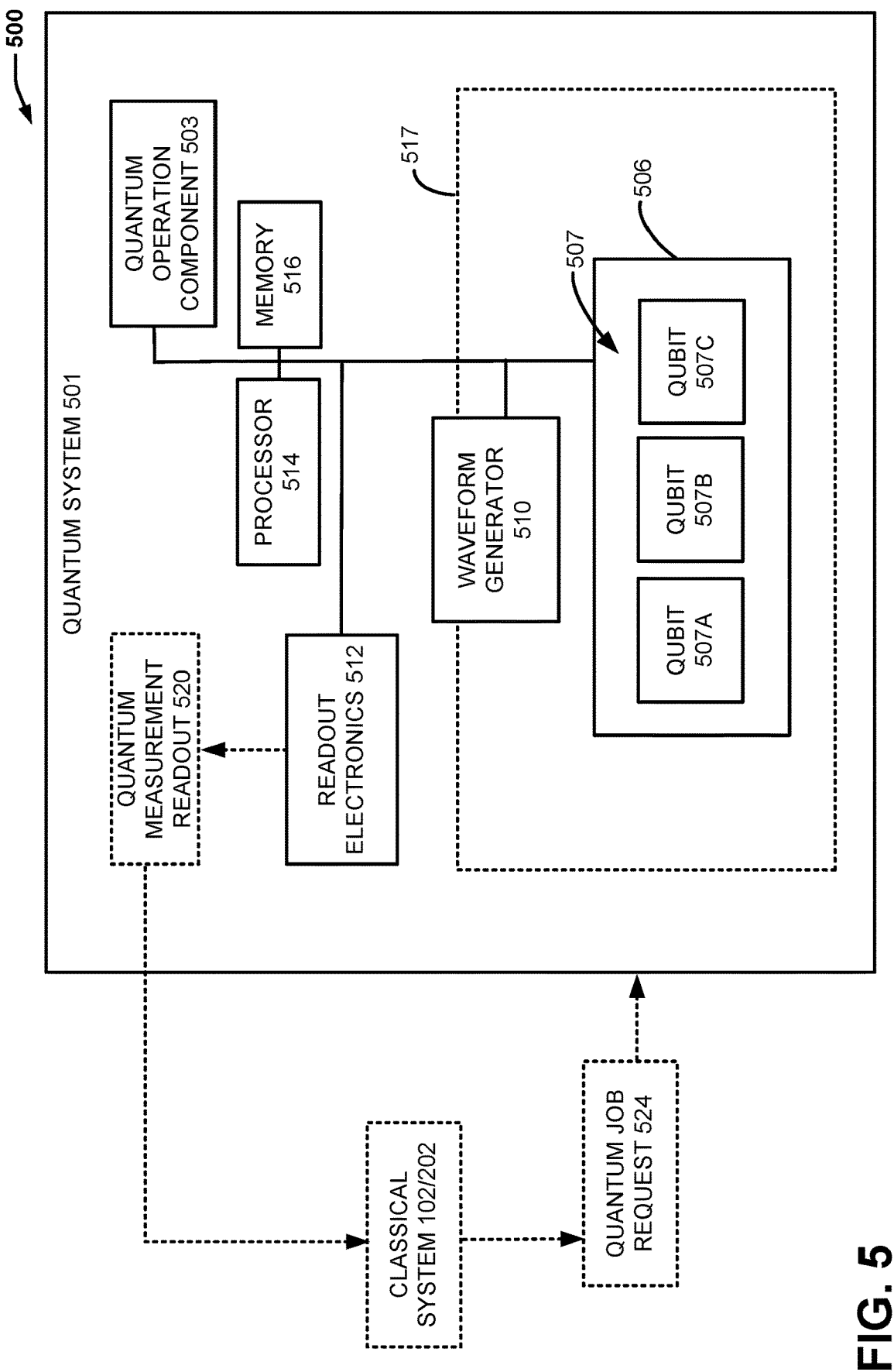
FIG. 5 illustrates a block diagram of a quantum system that can be employed in connection with the non-limiting systems of FIGS. 1 and 2, in accordance with one or more embodiments described herein.

Turning now in particular to one or more figures, and first to FIG. 1, the figure illustrates a block diagram of an example, non-limiting system 100 that can facilitate a process to generate noise-attenuated and noise-amplified expectation value results from a same error mitigation set of quantum circuits, in accordance with one or more embodiments described herein. That is, the non-limiting system 100 can facilitate the process to generate noise-attenuated and noise-amplified expectation value results from a same error mitigation set of quantum circuits, in combination with employment of a quantum system 501 (FIG. 5).

The non-limiting system 100 can comprise a quantum error mitigation system 102 and a quantum system 501, to be described in detail below. It is noted that the quantum error mitigation system 102 is only briefly detailed to provide but a lead-in to a more complex and/or more expansive quantum error mitigation system 202 as illustrated at FIG. 2. That is, further detail regarding processes that can be performed by one or more embodiments described herein will be provided below relative to the non-limiting system 200 of FIG. 2.

Still referring to FIG. 1, the quantum error mitigation system 102 can comprise at least a memory 104, bus 105, processor 106, execution component 114 and evaluation component 118. Using these components and the quantum system 501, the quantum error mitigation system 102 can provide output of noise-attenuated and noise-amplified expectation value results from a same error mitigation set 144 of quantum circuits.

Generally, the execution component 114 can direct employment of a quantum processor (e.g., quantum processor 506 of quantum system 501 of FIG. 5), for execution of an error mitigation set 144 of quantum circuits that were noise-adjusted by employing noise scaling.

Using expectation value results 184, resulting from the execution, the evaluation component 118 can generally perform a first generation of a first average expectation value 191 corresponding to a noise-attenuated result of the execution a second generation of a second average expectation value 192 corresponding to a noise-amplified result of the same execution.

It is noted that the execution component 114 and the evaluation component 118 each can operate at a classical system of and/or comprising the quantum error mitigation system 102.

In general, the non-limiting system 100 can employ any suitable method of communication (e.g., electronic, communicative, internet, infrared, fiber, etc.) to provide communication between the quantum error mitigation system 102 and the quantum system 501.

Turning next to FIG. 2, a non-limiting system 200 is illustrated that can comprise a quantum error mitigation system 202. Repetitive description of like elements and/or processes employed in respective embodiments is omitted for sake of brevity. Description relative to an embodiment of FIG. 1 can be applicable to an embodiment of FIG. 2. Likewise, description relative to an embodiment of FIG. 2 can be applicable to an embodiment of FIG. 1.

Generally, the quantum error mitigation system 202 can generate noise-attenuated and noise-amplified expectation value results from a same error mitigation set of quantum circuits, in connection with employment of a quantum processor 506 of a quantum system 501 (FIG. 5) for execution of one or more quantum circuits using one or more physical qubits.

Turning first to the quantum error mitigation system 202, one or more communications between one or more components of the non-limiting system 200 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The quantum error mitigation system 202 can be associated with, such as accessible via, a cloud computing environment.

The quantum error mitigation system 202 can comprise a plurality of components. The components can comprise a memory 204, processor 206, bus 205, error mitigation component 212, execution component 214, determination component 216, evaluation component 218 and/or fitting component 220. Using these components, the quantum error mitigation system 202 can generally provide an error mitigation set 244 of quantum circuits, provide a set of expectation value results 284 therefrom, and subsequently provide an error mitigated estimate 294 of a true expectation value 295 for one or more quantum circuits.

Discussion first turns briefly to the processor 206, memory 204 and bus 205 of the quantum error mitigation system 202. For example, in one or more embodiments, the quantum error mitigation system 202 can comprise the processor 206 (e.g., computer processing unit, microprocessor, classical processor, quantum processor and/or like processor). In one or more embodiments, a component associated with quantum error mitigation system 202, as described herein with or without reference to the one or more figures of the one or more embodiments, can comprise one or more computer and/or machine readable, writable and/or executable components and/or instructions that can be executed by processor 206 to provide performance of one or more processes defined by such component and/or instruction. In one or more embodiments, the processor 206 can comprise the error mitigation component 212, execution component 214, determination component 216, evaluation component 218 and/or fitting component 220.

In one or more embodiments, the quantum error mitigation system 202 can comprise the computer-readable memory 204 that can be operably connected to the processor 206. The memory 204 can store computer-executable instructions that, upon execution by the processor 206, can cause the processor 206 and/or one or more other components of the quantum error mitigation system 202 (e.g., error mitigation component 212, execution component 214, determination component 216, evaluation component 218 and/or fitting component 220) to perform one or more actions. In one or more embodiments, the memory 204 can store computer-executable components (e.g., error mitigation component 212, execution component 214, determination component 216, evaluation component 218 and/or fitting component 220).

The quantum error mitigation system 202 and/or a component thereof as described herein, can be communicatively, electrically, operatively, optically and/or otherwise coupled to one another via a bus 205. Bus 205 can comprise one or more of a memory bus, memory controller, peripheral bus, external bus, local bus, quantum bus and/or another type of bus that can employ one or more bus architectures. One or more of these examples of bus 205 can be employed.

In one or more embodiments, the quantum error mitigation system 202 can be coupled (e.g., communicatively, electrically, operatively, optically and/or like function) to one or more external systems (e.g., a non-illustrated electrical output production system, one or more output targets and/or an output target controller), sources and/or devices (e.g., classical and/or quantum computing devices, communication devices and/or like devices), such as via a network. In one or more embodiments, one or more of the components of the quantum error mitigation system 202 and/or of the non-limiting system 200 can reside in the cloud, and/or can reside locally in a local computing environment (e.g., at a specified location).

In general, the non-limiting system 200 can employ any suitable method of communication (e.g., electronic, communicative, internet, infrared, fiber, etc.) to provide communication between the quantum error mitigation system 202 and the quantum system 501.

In addition to the processor 206 and/or memory 204 described above, the quantum error mitigation system 202 can comprise one or more computer and/or machine readable, writable and/or executable components and/or instructions that, when executed by processor 206, can provide performance of one or more operations defined by such component and/or instruction.

Discussion next turns to the additional components of the quantum error mitigation system 202 (e.g., error mitigation component 212, execution component 214, determination component 216, evaluation component 218 and/or fitting component 220).

Turning first to the error mitigation component 212, the error mitigation component 212 can generally identify, search, receive, transfer and/or otherwise obtain input data from one or more databases, online resources, entities and/or information caches. The input data can comprise a set of quantum data 240. This input data can be made available to and/or transmitted to the other components of the quantum error mitigation system 202.

The error mitigation component 212 can perform noise scaling to attenuate noise in a set of initial quantum circuits 242, resulting in an error mitigation set 244 of quantum circuits.

Figure 4:
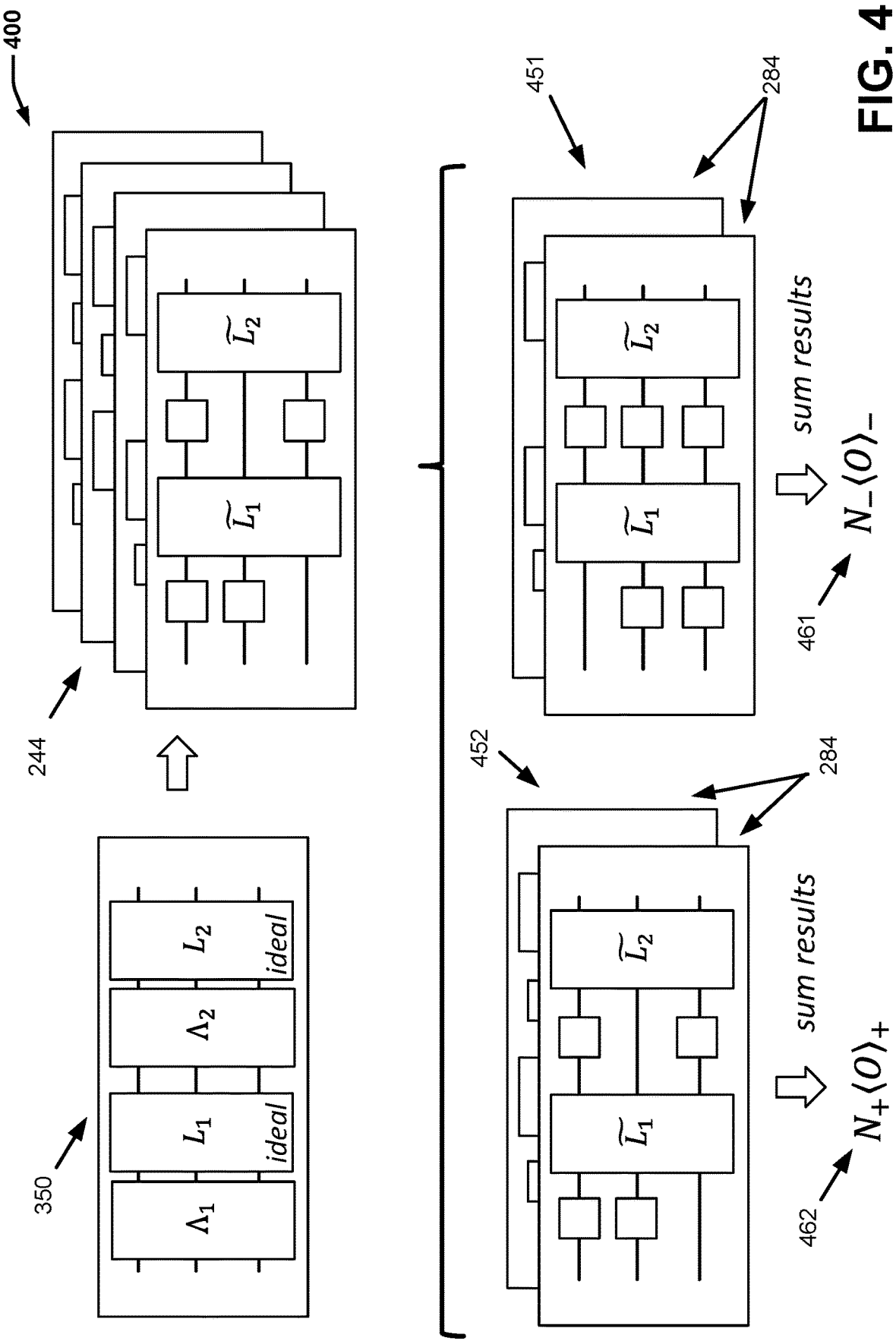
FIG. 4 provides an illustration of quantum circuits that can be executed by a quantum system, relative to the non-limiting system of FIG. 2, in accordance with one or more embodiments described herein.

That is, the error mitigation component 212 can, as a result of the noise scaling (e.g., as part of the noise scaling), add an odd number of local errors to a first subset of the initial quantum circuits 242 (e.g., each quantum circuit corresponding to a first portion 451 of FIG. 4 of the expectation value results 284), and an even number of local errors to a second subset of the initial quantum circuits 242 (e.g., each quantum circuit corresponding to a second portion 452 of FIG. 4 of the expectation value results 284).

Figure 3:
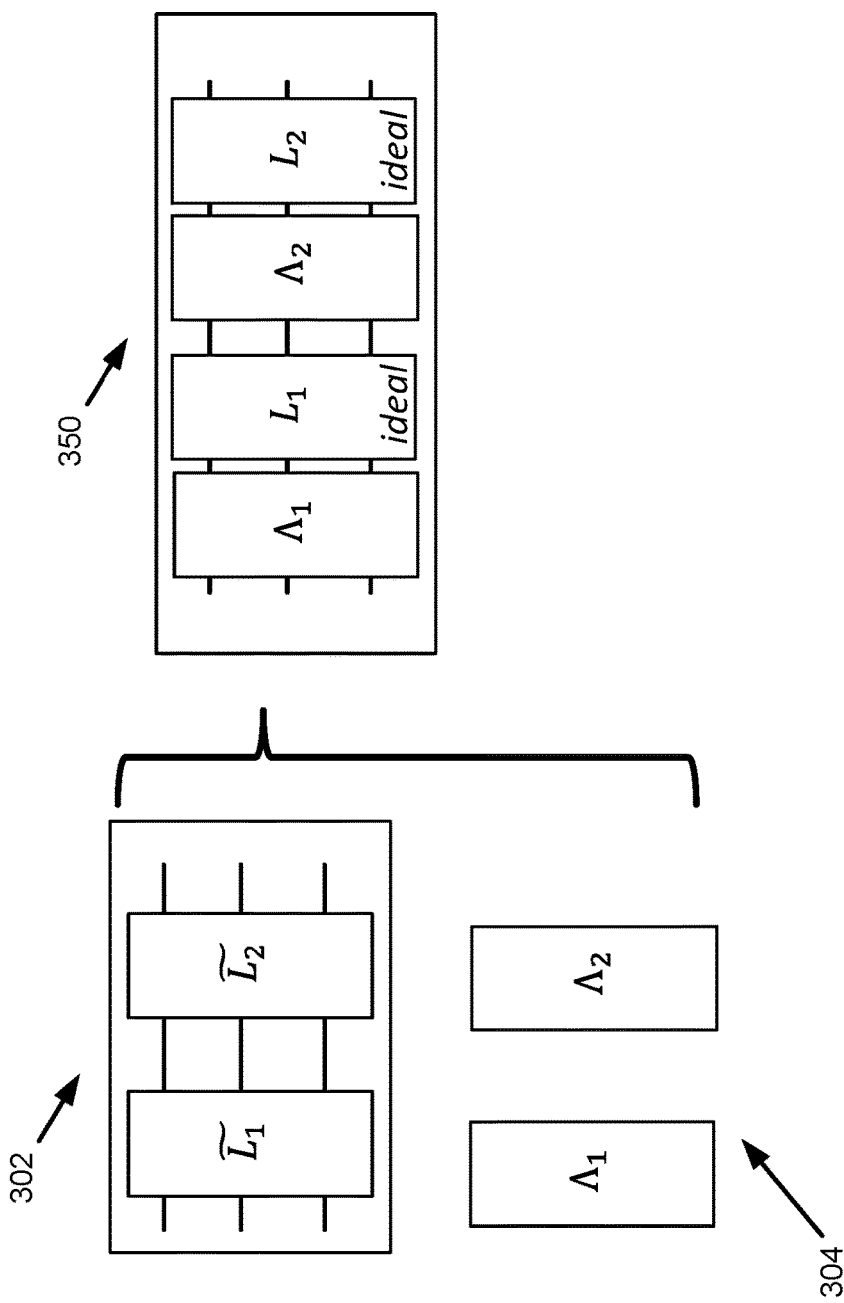
FIG. 3 provides an illustration of quantum circuits that can be prepared by the non-limiting system of FIG. 2, in accordance with one or more embodiments described herein.

For example, turning briefly to the schematic 300 of FIG. 3, based on one or more learned noise models $\Lambda_i$ 304, from corresponding noise characterization process not discussed herein, a noisy quantum circuit $\tilde{C}$ 302 (e.g., an initial quantum circuit 242) can be error mitigated by the error mitigation component 212, resulting in a first base model 350 of the noisy circuit $\tilde{C}$.

For example, the error mitigation component 212 can define the quantum circuits using PEC to scale the effective error rates by noise gain $G_0$. It can be desired to estimate an observable expectation value $\langle O \rangle$ (e.g., a true expectation value 295) at the end of execution an ideal circuit C. The result of compiling circuit C onto a given noisy quantum processor is a circuit $\tilde{C}$ containing unique, noisy layers $\{L_l\}$. For each $L_l$, a suitable noise model $\Lambda_l$ can be learned.

For definiteness in one or more examples, one can focus on a 2-local Pauli-Lindblad (2PL) model, though other models can be suitable. For example, a 2PL model consists of a set of 2-local Pauli errors $\{P_i\}$ occurring with independent probabilities $$p_{l,i} = \frac{1}{2}\left(1 - e_l^{-2\lambda_{l,i}}\right),$$

where $\lambda_{l,i}$ is the error generator rate associated with local Pauli error $P_i$ in layer $L_l$.

Turning next briefly to FIG. 4, the error mitigation component 212 can generate the error mitigation set 244 of quantum circuits by adding random quantities of local errors to various copies of the initial quantum circuit 242. For example, the local errors can be randomized for all copies of each quantum circuit. Thus, different local errors can be randomly added to each quantum circuit. The probabilities with which these errors are added can be determined by the noise model $\Lambda$ and the noise gain G. That is, as illustrated at FIG. 4, the error mitigation set 244 of quantum circuits comprises a plurality of copies of $\tilde{C}$ with extra random errors inserted to match $\Lambda_l^{1-G_0}$.

For example, the error mitigation component 212 can produce many copies of C by randomly inserting errors into each copy according to the model such that PEC lowers the effective error rates $\lambda_{l,i}$ for the collection of quantum circuits by desired noise gain factor $G_0$, where $0<G_0<1$. Choosing $G_0>0$ can provide a lower sampling cost than $G_0=0$. Choices of $1<G_0<2$ can be effectively realized by first making the replacement $G_0 \rightarrow |2-G_0|$.

Per a standard PEC routine understood by one having ordinary skill in the art, for each quantum circuit of the error mitigation set 244, the error mitigation component 212 can record whether an odd number or an even number of local errors were randomly inserted. For example, in the case of the 2PL model, these are weight-1 or weight-2 Pauli errors.

Regarding the above-described one or more processes of the error mitigation component 212, it is recognized that any one or more of these processes can be performed external to the one or more embodiments described herein. For example, in one or more embodiments, the quantum error mitigation system 202 can omit the error mitigation component 212.

Using the error mitigation set 244 of quantum circuits, whether provided by/obtained from the error mitigation component 212 or from another suitably communicatively connected source, the execution component 214 can direct employment of a quantum processor (e.g., quantum processor 506 of quantum system 501 of FIG. 5), for execution of the error mitigation set 244 of quantum circuits that were noise-adjusted by employing the noise scaling. That is, the execution component 214 can direct the execution at a quantum processor 506 of the quantum system 501 by directing the quantum system 501 to execute the error mitigation set 244 of quantum circuits. For example, the execution component 214 can send one or more quantum job requests 524 (FIG. 5) to the quantum system 501 and/or can make the one or more quantum job requests 524 available to the quantum system 501 for the quantum system 501, such as the quantum operation component 503) to obtain the one or more quantum job requests 524.

Next, prior to discussion of use of measurement outcomes 282 resulting from the execution of the error mitigation set 244 of quantum circuits, and prior to the discussion of determination of resultant expectation values 284 from subsequent processing of the measurement outcomes 282, discussion first turns to the execution of the error mitigation set 244 of quantum circuits at the quantum system 501. That is, the operation of the quantum system 501 can allow for the output of the quantum measurement readouts 520 and thus allow for the determination of the first average expectation value 291 and the second average expectation value 292.

Turning to FIG. 5, one or more embodiments described herein can include one or more devices, systems and/or apparatuses that can provide a process to generate one or more waveforms for a quantum-based operation (e.g., using a quantum device), such as for operating one or more qubits of a quantum device. Accordingly, at FIG. 5, illustrated is a block diagram of an example, non-limiting system 500 that can at least partially facilitate such a process. While referring here to one or more processes, facilitations and/or uses of the non-limiting system 500, description provided herein, both above and below, also can be relevant to one or more other non-limiting systems described herein, such as the non-limiting systems 100 and/or 200.

As illustrated at FIG. 5, the non-limiting system 500 can comprise a quantum system 501 that can be employed with or separate from the classical systems 102/202.

Generally, the quantum system 501 (e.g., quantum computer system, superconducting quantum computer system and/or the like) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high level components and/or functions. The quantum circuitry can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement readout 520, can be responsive to the quantum job request 524 and associated input data and can be based at least in part on the input data, quantum functions and/or quantum computations.

In one or more embodiments, the quantum system 501 can comprise quantum components, such as a quantum operation component 503, a quantum processor 506, pulse component 510 (e.g., a waveform generator) and/or a readout electronics 512 (e.g., readout component). In one or more other embodiments, the readout electronics 512 can be comprised at least partially by the classical system 102/202 and/or be external to the quantum system 501. The quantum processor 506 can comprise one or more, such as plural, qubits 507. Individual qubits 507A, 507B and 507C, for example, can be fixed frequency and/or single junction qubits, such as transmon qubits.

In one or more embodiments, a memory 516 and/or processor 514 can be associated with the quantum operation component 503, where suitable. The processor 514 can be any suitable processor. The processor 514 can generate one or more instructions for controlling the one or more processes of the quantum operation component 503.

The quantum operation component 503 can obtain (e.g., download, receive, search for and/or the like) a quantum job request 524 requesting execution of one or more quantum programs and/or a physical qubit layout. The quantum job request 524 can be provided in any suitable format, such as a text format, binary format and/or another suitable format. In one or more embodiments, the quantum job request 524 can be obtained by a component other than of the quantum system 501, such as a by a component of the classical systems 102/202.

The quantum operation component 503 can determine mapping of one or more quantum logic circuits for executing a quantum program. In one or more embodiments, the quantum operation component 503 and/or quantum processor 506 can direct the waveform generator 510 to generate one or more pulses, tones, waveforms and/or the like to affect one or more qubits 507, such as in response to a quantum job request 524.

The waveform generator 510 can generally cause the quantum processor 506 to perform one or more quantum processes, calculations and/or measurements by creating a suitable electro-magnetic signal. For example, the waveform generator 510 can operate one or more qubit effectors, such as qubit oscillators, harmonic oscillators, pulse generators and/or the like to cause one or more pulses to stimulate and/or manipulate the state(s) of the one or more qubits 507 comprised by the quantum system 501.

The quantum processor 506 and a portion or all of the waveform generator 510 can be contained in a cryogenic environment, such as generated by a cryogenic environment 517, such as effected by a dilution refrigerator. Indeed, a signal can be generated by the waveform generator 510 to affect one or more of the plurality of qubits 507. Where the plurality of qubits 507 are superconducting qubits, cryogenic temperatures, such as about 4K or lower, can be employed for function of these physical qubits. Accordingly, one or more elements of the readout electronics 512 also can be constructed to perform at such cryogenic temperatures.

The readout electronics 512, or at least a portion thereof, can be contained in the cryogenic environment 517, such as for reading a state, frequency and/or other characteristic of qubit, excited, decaying or otherwise.

It is noted that the aforementioned description(s) refer(s) to the operation of a single set of instructions run on a single qubit. However, scaling can be achieved. For example, instructions can be calculated, transmitted, employed and/or otherwise used relative to one or more qubits (e.g., non-neighbor qubits) in parallel with one another, one or more quantum circuits in parallel with one another, and/or one or more qubit mappings in parallel with one another.

Turning now back to FIG. 2, as a result of output of the one or more quantum measurement readouts 520 by the quantum system 501, resulting from the execution of the error mitigation set 244 of quantum circuits, the determination component 216 can determine corresponding measurement outcomes 282 and subsequent expectation value results 284 therefrom.

Using the expectation value results 284, the evaluation component 218 can generally perform a first generation of a first average expectation value 291 corresponding to a noise-attenuated result of the execution a second generation of a second average expectation value 292 corresponding to a noise-amplified result of the same execution.

For example, attention is next directed again to FIG. 4. At FIG. 4, illustrated is are results (451, 452) of executions of the error mitigation set 244 of quantum circuits, which results based on the aforementioned recording of which quantum circuits had which quantity of local errors added thereto in connection with the error mitigation (e.g., performed by the error mitigation component 212).

A first portion 451 of the expectation value results 284 comprise quantum circuits error mitigated by the addition of an odd number of local errors. A sum of these expectation value results 284 of the first portion 451 is a first sum 461, $N_-\langle O \rangle_-$.

A second portion 452 of the expectation value results 284 comprise quantum circuits error mitigated by the addition of an even number of local errors. A sum of these expectation value results 284 of the second portion 452 is a second sum 462, $N_+\langle O \rangle_+$.

Figure 6:
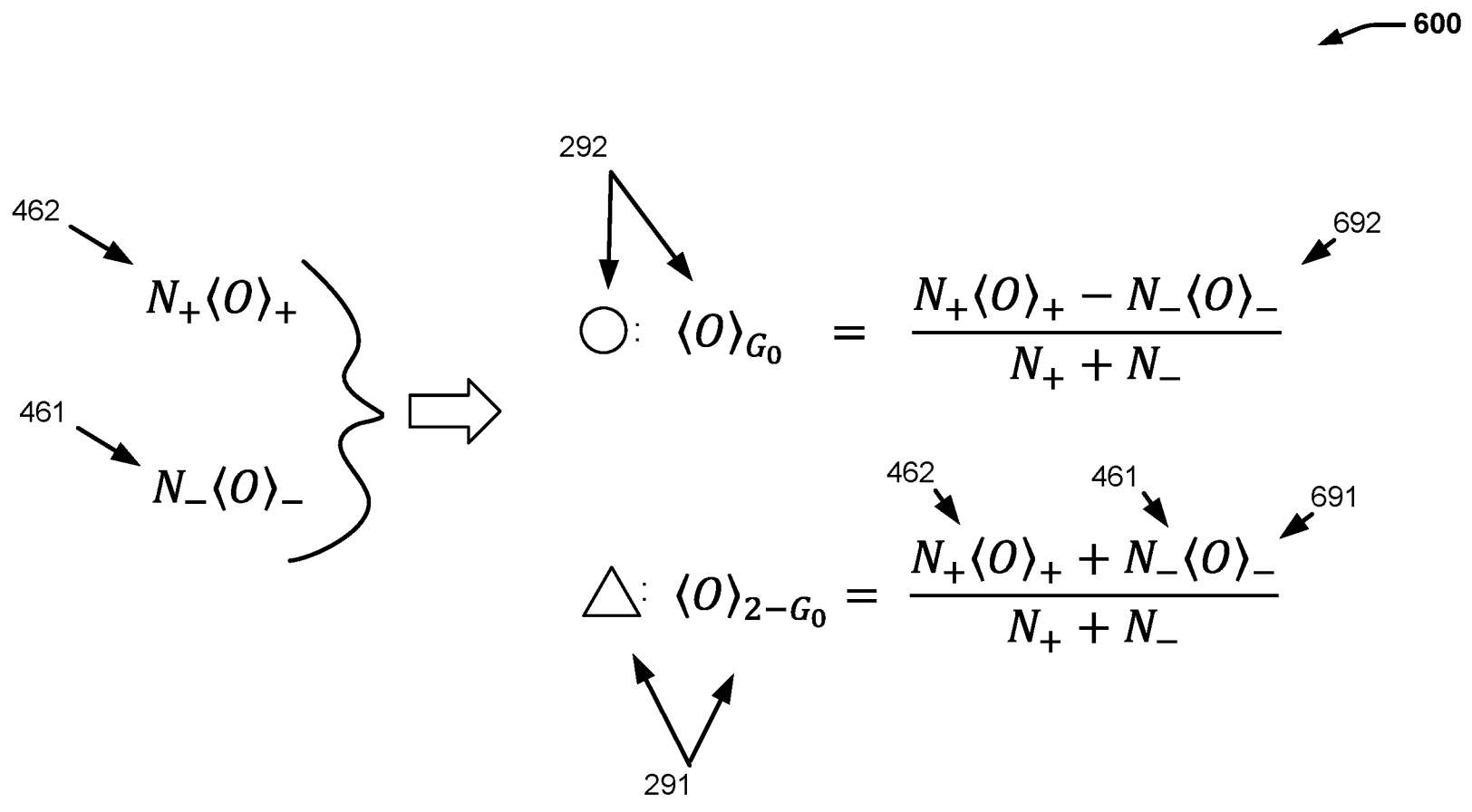

Turning next to FIG. 6, as illustrated, as part of an evaluation 600, the evaluation component 218 can generate the first generation comprising the first average expectation value 291 of all of the results (e.g., expectation values 284) of the execution of the error mitigation set of quantum circuits 242.

That is, a third sum 691 (e.g., numerator 691) of the first sum 461 and the second sum 462 can be divided by a total number (e.g., total quantity) of the error mitigation set of quantum circuits 244 (e.g., $N_++N_-$) to obtain the first average expectation value 291, $\langle O \rangle_{2-G_0}$.

Put another way, simply take the average result from all circuits. This value, $\langle O \rangle_{|2-G_0|}$, corresponds to noise gain $G=|2-G_0|$. Since $0<G_0<1$, this simplifies to $G=2-G_0$.

Also as illustrated at FIG. 6, and also as part of the evaluation 600, the evaluation component 218 can generate the second generation comprising the second average expectation value 292 of a remaining subset of all of the results of the execution of the quantum circuits of the error mitigation set 244. Briefly, with additional detailed description to follow, the remaining subset comprises a result of negation of a first sum 461 of a first portion 451 of the results 284 of the execution of the error mitigation set of quantum circuits 242 from a second sum 462 of a second portion 452 of the results 284 of the execution of the error mitigation set of quantum circuits 242. It is noted that the first portion 451 and the second portion 452 together comprise all of the results 284 of execution of the quantum circuits of the error mitigation set 244.

That is, a fourth sum 692 (e.g., numerator 692) of a negation of the first sum 461 from the second sum 462 can be divided by a total number (e.g., total quantity) of the error mitigation set of quantum circuits 244 (e.g., $N_++N_-$) to obtain the second average expectation value 292, $\langle O \rangle_{G_0}$.

Put another way, analyze the results again, but per the general PEC routine, take the average expectation value result from all circuits after negating the results from all circuits in which an odd number of local errors (weight-1 or weight-2) were randomly inserted. This value, $\langle O \rangle_{G_0}$, corresponds to noise gain $G=G_0$.

It is noted that order of performance of these results 291, 292 can be swapped and/or completed at least partially in parallel with one another.

Figure 7:
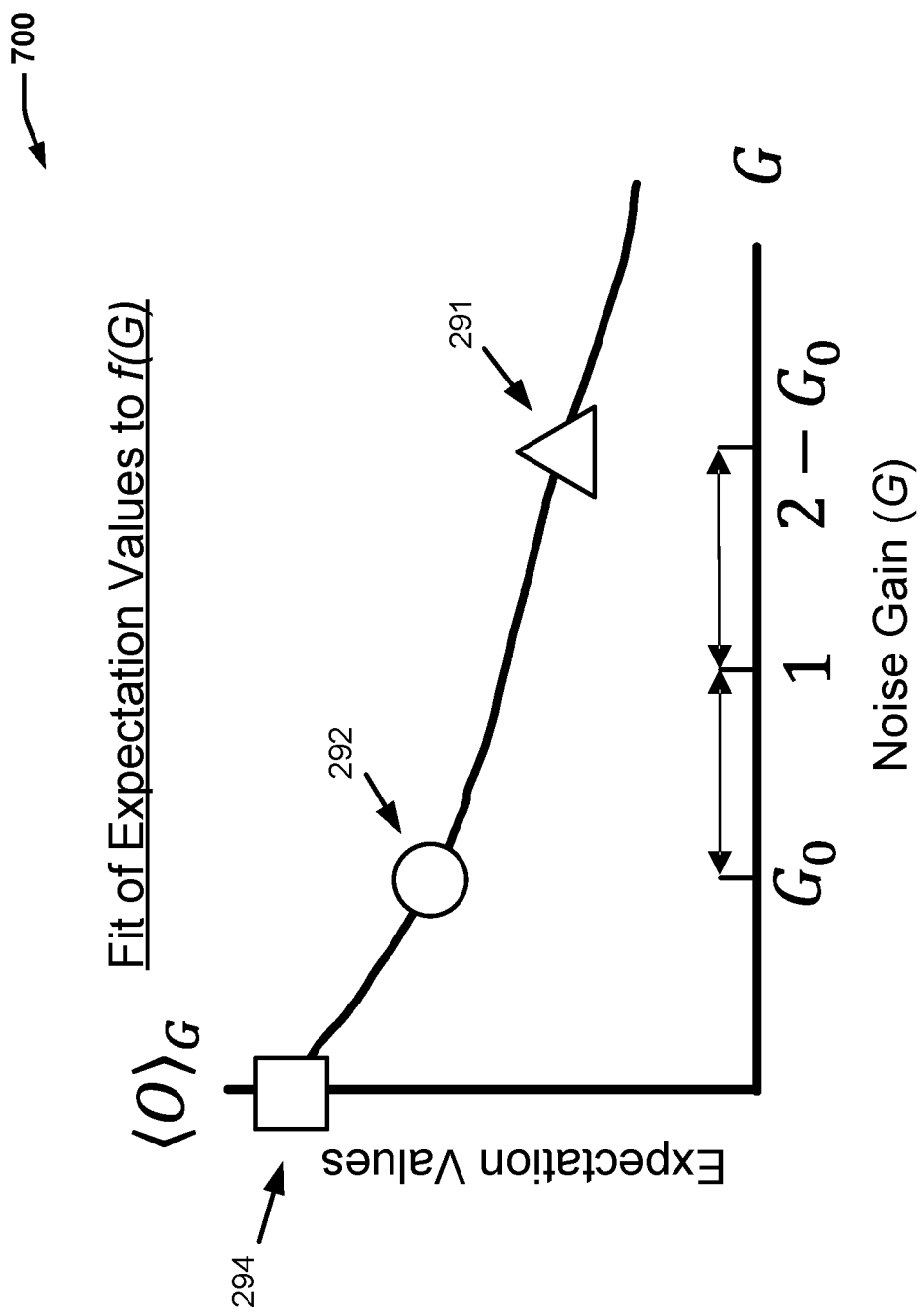
FIG. 7 illustrates a graph of expectation values fit to a suitable curve, the fitting of which can be performed by the non-limiting system of FIG. 2, in accordance with one or more embodiments described herein.

In one or more embodiments, the evaluation component 218 can determine whether one or more additional generations of one or more average expectation values are to be executed, such as based on a selected statistical threshold for subsequent fitting of the average expectation values to a selected function (e.g., function $f(G)$ of graph 700 of FIG. 7).

If yes, the non-limiting system 200, and particularly the quantum error mitigation system 202, can perform additional generations of average expectation values for noise gains other than those corresponding to the first generation or the second generation (e.g., for other noise gains $0<G_g<1$, if desired). This performance can comprise performing noise scaling by the error mitigation component 212, execution of resulting an error mitigation set of quantum circuits by the execution component 214, determination of results of the execution of the error mitigation set of quantum circuits by the determination component 216, and subsequent generation of the additional average expectation values by the evaluation component 218.

When at least the first average expectation value 291 and the second average expectation value 292 are provided, the fitting component 220 can perform zero-noise extrapolation, using the first average expectation value 291 and the second average expectation value 292. That is, the fitting component 220 can perform ZNE on all results, $\{\langle O \rangle_{G_g}\}$ and $\{\langle O \rangle_{|2-G_g|}\}$.

Turning next to FIG. 7, based on the performance of the evaluation component 218, the fitting component 220 can perform ZNE by fitting the expectation value results to a selected functional model (e.g., functional model $f(G)$ of graph 700).

As illustrated at the graph 700 of fit of expectation values to the functional model $f(G)$, at least both the first average expectation value 291 and the second average expectation value 292 are employed to obtain a suitable fit.

That is, the fitting component 220 can fit all results {⟨O⟩$_G$} with a few-parameter fit model $f(G)$. For example, $f(G)$ can be a polynomial function, exponential function, or combination thereof.

Subsequently, based on the fitting, the fitting component 220 can determine, such as by suitable extrapolation understood by one having ordinary skill in the art, an error mitigated estimate 294 (e.g., an extrapolated ZNE result) of the true expectation value 295 of the initial quantum circuit 242, thus completing the one or more frameworks described herein. The error-mitigated estimate 294 of the true expectation value ⟨O⟩ 295 is the y-intercept of the resulting model, $f(0)$.

Figure 8:
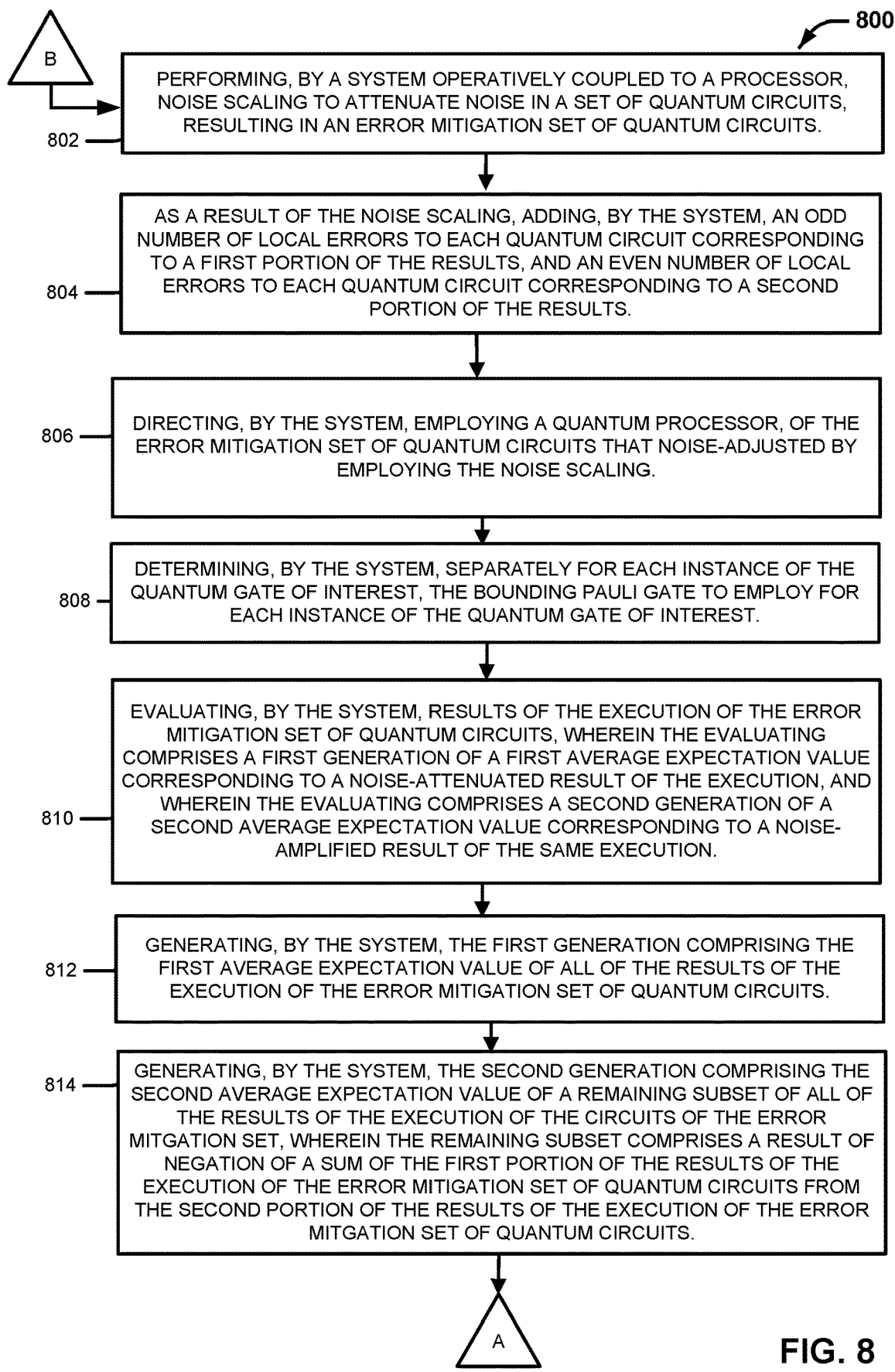
FIG. 8 illustrates a flow diagram of one or more processes that can be performed by the non-limiting system of FIG. 2, in accordance with one or more embodiments described herein.
Figure 9:
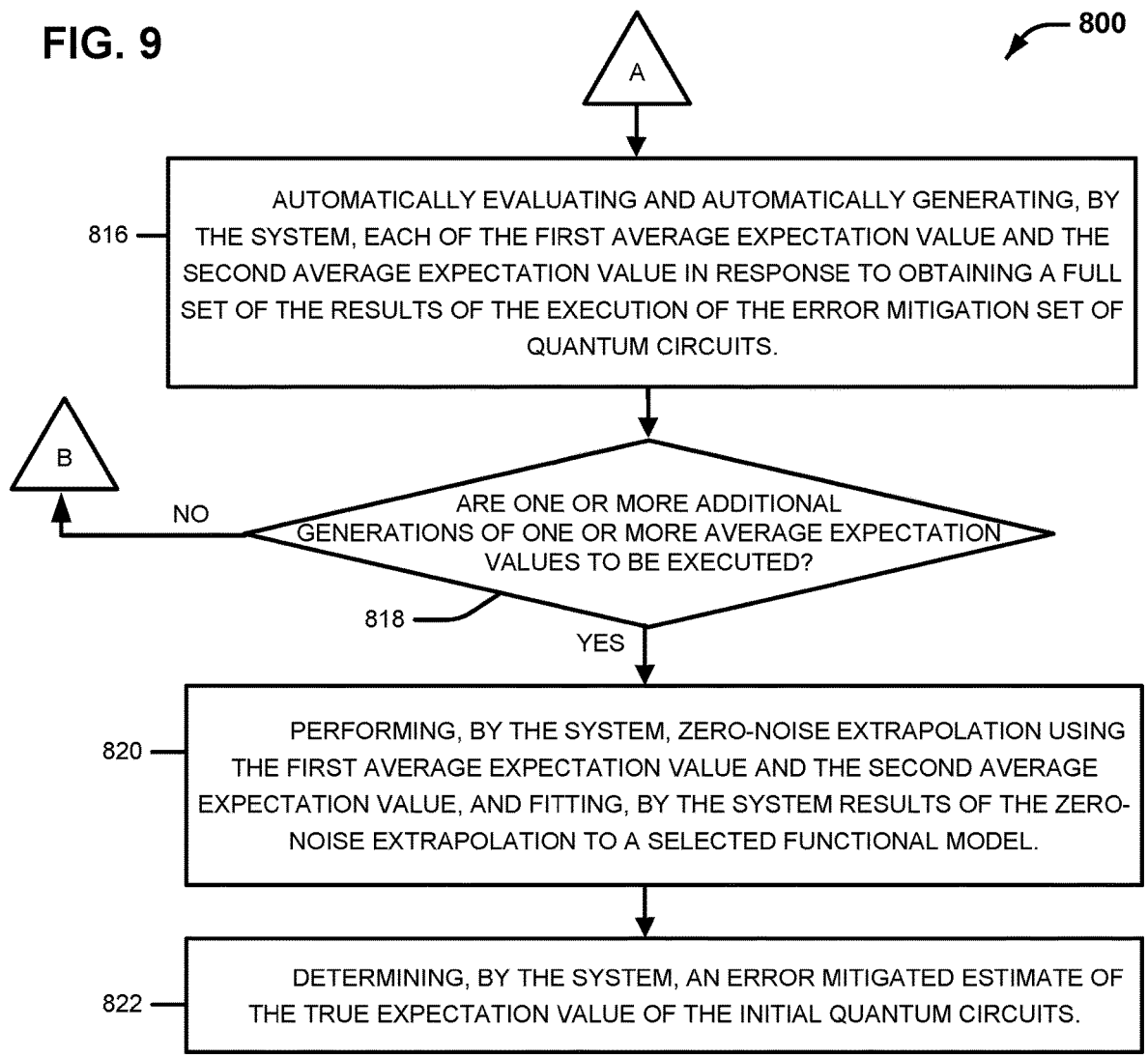
FIG. 9 illustrates a continuation of the flow diagram of FIG. 8 of one or more processes that can be performed by the non-limiting system of FIG. 2, in accordance with one or more embodiments described herein.

As a summary, referring next to FIGS. 8 and 9, illustrated is a flow diagram of an example, non-limiting method 800 that can provide a process to obtain a pair of error mitigated average expectation values, in accordance with one or more embodiments described herein, such as the non-limiting system 200 of FIG. 2. While the non-limiting method 800 is described relative to the non-limiting system 200 of FIG. 2, the non-limiting method 800 can be applicable also to other systems described herein, such as the non-limiting system 100 of FIG. 1. Repetitive description of like elements and/or processes employed in respective embodiments is omitted for sake of brevity.

At 802, the non-limiting method 800 can comprise performing, by a system operatively coupled to a processor (e.g., error mitigation component 212), noise scaling to attenuate noise in a set of quantum circuits, resulting in an error mitigation set of quantum circuits (e.g., error mitigation set 244 of quantum circuits).

At 804, the non-limiting method 800 can comprise, as a result of the noise scaling, adding, by the system (e.g., error mitigation component 212), an odd number of local errors to each quantum circuit corresponding to a first portion (e.g., first portion 451) of the results, and an even number of local errors to each quantum circuit corresponding to a second portion (e.g., second portion 452) of the results.

At 806, the non-limiting method 800 can comprise directing, by the system (e.g., execution component 214), employing a quantum processor (e.g., quantum processor 506), of the error mitigation set of quantum circuits that were noise-adjusted by employing the noise scaling.

At 808, the non-limiting method 800 can comprise determining, by the system (e.g., determination component 216), results (e.g., measurement outcomes 282 from quantum measurement readout 520) of the execution of the error mitigation set of quantum circuits.

At 810, the non-limiting method 800 can comprise evaluating, by the system (e.g., evaluation component 218), at an evaluation (e.g., evaluation 600), results of the execution of the error mitigation set of quantum circuits, wherein the evaluating comprises a first generation of a first average expectation value (e.g., first average expectation value 291) corresponding to a noise-attenuated result of the execution, and wherein the evaluating comprises a second generation of a second average expectation value (e.g., second average expectation value 292) corresponding to a noise-amplified result of the same execution.

At 812, the non-limiting method 800 can comprise generating, by the system (e.g., evaluation component 218) the first generation comprising the first average expectation value of all of the results (e.g., expectation values 284 or numerator 691) of the execution of the error mitigation set of quantum circuits.

At 814, the non-limiting method 800 can comprise generating, by the system (e.g., evaluation component 218), the second generation comprising the second average expectation value of a remaining subset (e.g., remaining subset equal to the numerator 692) of all of the results of the execution of the quantum circuits of the error mitigation set, wherein the remaining subset comprises a result of negation of a sum of the first portion of the results (e.g., sum 461) of the execution of the error mitigation set of quantum circuits from a sum of the second portion of the results (e.g., sum 462) of the execution of the error mitigation set of quantum circuits.

In one or more embodiments, the first portion and the second portion together comprise all of the results of execution of the quantum circuits of the error mitigation set.

At 816, the non-limiting method 800 can comprise, automatically evaluating and automatically generating, by the system (e.g., evaluation component 218), each of the first average expectation value and the second average expectation value in response to obtaining a full set of the results of the execution of the error mitigation set of quantum circuits.

At 818, the non-limiting method 800 can comprise, determining, by the system (e.g., evaluation component 218), whether one or more additional generations of one or more average expectation values are to be executed, based on a selected statistical threshold for subsequent fitting of the average expectation values to a selected function.

If yes, the non-limiting method 800 can proceed back to step 802 for performance of additional generations, by the system, of average expectation values for noise gains other than those corresponding to the first generation or the second generation. This performance can comprise performing noise scaling by the error mitigation component 212, execution of a resulting error mitigation set of quantum circuits by the execution component 214, determination of results of the execution of the error mitigation set of quantum circuits by the determination component 216, and subsequent generation of the additional average expectation values by the evaluation component 218.

If no, the non-limiting method can proceed to step 820.

At 820, the non-limiting method 800 can comprise performing, by the system (e.g., fitting component 220), zero-noise extrapolation using the first average expectation value and the second average expectation value, and fitting, by the system (e.g., fitting component 220) results of the zero-noise extrapolation to a selected functional model (e.g., functional model $f(G)$ of graph 700).

At 822, the non-limiting method 800 can comprise determining, by the system (e.g., fitting component 220), an error mitigated estimate of the true expectation value (e.g., error mitigated estimate 294 of the true expectation value 295) of the initial quantum circuits (e.g., initial quantum circuits 242).

Additional Summary

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, the one or more embodiments described herein can provide a system, computer-implemented method and/or computer program product to provide for error mitigation. A system comprises a memory that stores and a processor that executes computer executable components stored in the memory, wherein the computer executable components comprise an execution component 114, 214 that directs execution, employing a quantum processor 506, of an error mitigation set 144, 244 of quantum circuits that were noise-adjusted by employing noise scaling, and an evaluation component 118, 218, that evaluates, at an evaluation, results 184, 284 of the execution of the error mitigation set 144, 244 of quantum circuits, wherein the evaluation comprises a first generation of a first average expectation value 191, 291 corresponding to a noise-attenuated result of the execution, and wherein the evaluation further comprises a second generation of a second average expectation value 192, 292 corresponding to a noise-amplified result of the same execution.

That is, the one or more embodiments described herein can provide for automatically evaluating and automatically generating, by the system (e.g., evaluation component 118, 218), each of the first average expectation value 191, 291 and the second average expectation value 192, 292 in response to obtaining a full set of the results 184, 284 of the execution of the error mitigation set 144, 244 of quantum circuits.

A benefit of the system, computer-implemented method and/or computer program product can be use of a same set of shots, a same set of data, and/or a same set of quantum circuit executions resulting from the data for determining both an error-attenuated expectation value result and an error-amplified expectation value result from the data. In comparison to existing frameworks, this can result in reduction in the sampling cost for determination of both the error-attenuated expectation value result and the error-amplified expectation value result. As used herein, the term "sampling cost" can refer to the repeat execution of a quantum circuit, or a variation thereof.

Another benefit of the system, computer-implemented method and/or computer program product can be an ability to use the complementary estimate, the other of the error-attenuated expectation value result and the error-amplified expectation value result, to improve subsequent performance of zero-noise extrapolation (ZNE). For example, a two-parameter exponential fit model $f(G)=Ae^{-kG}$ cannot be fit to a single expectation value result estimate, such as $\langle O \rangle_G$, but can be fit to a pair of estimates, such as $\{\langle O \rangle_G, \langle O \rangle_{2 \cdot G}\}$. As a result, performance of ZNE can then provide an improved estimate, $f(0)$, of an ideal expectation value.

Yet another benefit of the system, computer-implemented method and/or computer program product can generally be an improvement in the functioning of a quantum computer. This improvement over existing computerized technologies and/or quantum computerized technologies improves the function of a quantum computer with respect to noise caused by execution of the quantum computer. Indeed, for a non-limiting system comprising both a classical system as described herein and a quantum system as described herein (e.g., comprising a quantum computer), such non-limiting system can be self-improving through primary generation and execution of an error mitigation set of quantum circuits, at the result of an increased sampling cost, and through secondary evaluation of the results of the execution to elicit a pair of different noise-adjusted expectation value results from the same results.

Additionally and/or separately therefrom, a benefit can comprise an ability to improve the efficiency of using a quantum computer by mitigating errors caused by employment of the quantum computer. That is, through use of the system, computer-implemented method and/or computer program product, noise that is caused by execution of a particular quantum gate, use of a particular hardware, use of a particular qubit mapping, and/or the like, can be mitigated, through use of error mitigation techniques employing additional sampling, where the use comprises evaluation of results of one or more executions of one or more quantum circuits. The one or more executions can comprise, but is not limited to, use of one or more different waveforms defined by one or more additional and/or altered quantum gates, order of quantum gates, etc. to cause one or more different changes (e.g., of energy states, rotations, etc.) of one or more physical qubits of a quantum processor of the quantum computer. As a result of the evaluation of the results of the one or more executions, an error mitigated estimate of a true expectation value of an original (non-error mitigated) quantum circuit, or set of quantum circuits, can be determined. can be characterized.

Accordingly, the efficiency of use, and/or accuracy and/or precision of expectation value results one or more states and/or rotations to which one or more qubits of the quantum computer are caused to enter, can be increased by use of the system, computer-implemented method and/or computer program product.

Indeed, in view of the one or more embodiments described herein, a practical application of the one or more systems, computer-implemented methods and/or computer program products described herein can a single set of executions of quantum circuits to obtain both a noise-attenuated expectation value result and a noise-amplified expectation value result by the one or more systems, computer-implemented methods and/or computer program products described herein. This single set of executions can comprise reduced sampling cost (e.g., reduced executions) as compared to use of separate sets of executions to separately obtain the noise-attenuated expectation value result and the noise-amplified expectation value result.

That is, use of the one or more embodiments described herein can allow for reduced use of a quantum computer, allowing for other executions to be run. The use of the one or more embodiments described herein thus can result in reduced quantum system setup and calibrations for use in determination of at least a pair of average expectation values.

Accordingly, the applicant has discovered that, from a same set of data, a same set of quantum circuits derived from the data, a same set of error mitigations performed on the quantum circuits, and a same execution of the error mitigation set of quantum circuits, a noise-amplified expectation value result and a noise-attenuated expectation value result can both be obtained. That is, a noise-amplified PEC-based expectation value result and a noise-attenuated PEC-based expectation value result can be obtained from a same set of quantum circuit executions at a quantum computer. This can allow for a pair of results to better fit to a function, allowing for determination of an error mitigated estimate of a true expectation value relative to the one or more initial (pre-error mitigation) quantum circuits with reduced time, energy, classical system use and quantum system use, as compared to existing frameworks.

This result is surprising because it has been traditionally believed that the error mitigation required for a set of quantum circuits, and/or the quantum circuits pre-error mitigation themselves, was required to be different for obtaining the noise-amplified PEC-based expectation value result as compared to for obtaining the noise-attenuated PEC-based expectation value result.

Accordingly, it was unforeseen that the same one or more initial quantum circuits can be employed and reanalyzed for noise amplification and noise attenuation, as performed by the embodiments described herein.

That is, based on use of measurement outcomes from one error mitigation set of quantum circuit executions, both the noise-attenuated average expectation value and the noise-amplified average expectation value can be determined. It is noted that, typically, determination of the noise-attenuated average expectation value (e.g., the PEC-based result) has required a higher sampling cost than a sample cost for determination of the noise-amplified average expectation value (e.g., the noise-amplified PEC-based expectation value result). However, as compared to determination of both the noise-attenuated average expectation value (e.g., the noise-attenuated PEC-based expectation value result) and the noise-amplified average expectation value (e.g., the noise-amplified PEC-based expectation value result) separately, the one or more embodiments disclosed herein are configured to employ a lesser sampling cost. This can allow for higher efficiency, higher speed, reduced labor, reduced power, reduced bandwidth, reduced classical computation and/or reduced quantum computation, as compared to existing frameworks.

In connection therewith, the one or more embodiments described herein can provide useful and practical applications of computers, thus providing enhanced (e.g., improved and/or optimized) quantum circuit execution at a quantum processor and enhanced measurement outcomes from the quantum processor. Overall, such computerized tools can constitute a concrete and tangible technical improvement in the fields of quantum processing and/or quantum dynamics, without being limited thereto, and/or in fields of finance, biology, chemistry, materials science, pharmacology and/or drug-delivery using a quantum processor, without being limited thereto.

Furthermore, one or more embodiments described herein can be employed in a real-world system based on the disclosed teachings. For example, one or more embodiments described herein can function in combination with a physical quantum computer having a physical quantum processor. In response to one or more waveforms generated by a waveform generator of the quantum computer, physical quantum qubit hardware of the quantum processor can produce signals and/or changes in state of the qubit hardware, resulting in ability to measure such signals and/or changes in state of the qubit hardware. The measurements, e.g., the measurement outcomes, can be thereafter employed for various inference actions relative to sample quantum data corresponding to one or more quantum circuits having been executed on the quantum computer by way of operation of the waveform generator.

Moreover, one or more embodiments described herein can be implemented in one or more domains to enable scaled quantum processing. Indeed, use of a system, computer-implemented method and/or computer program product as described herein can be scalable, such as where plural quantum gates (e.g., input quantum gates) can be evaluated, processed (e.g., modified) and/or executed at a quantum processor at least partially at a same time as one another. These plural quantum gates can arise from one or more quantum circuits. Accordingly, scaling can be enabled for more than error mitigation set of quantum circuits at least partially in parallel with one another.

These scalings can be made possible by use of independent sets of physical qubits for each first quantum gate. That is, a quantum processor can comprise hardware for plural physical qubits. In view thereof, a qubit mapping can be determined for a single quantum processor for operation of various quantum circuits (e.g., relative to various quantum gates) at least partially in parallel with one another.

Furthermore, the classical processing employed corresponding to the plural quantum gates also can be performed at least partially in parallel with one another. That is, the processing for pre-execution modification of quantum circuits resulting in an error mitigation set of quantum circuits, post-measurement outcome determination of average expectation values, and/or post-measurement outcome curve fitting, can be performed at a classical computer and can be performed relative to plural error mitigation sets of quantum circuits at least partially in parallel with one another.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to automatic determination of an error mitigated estimate of a true expectation value, as compared to existing systems and/or techniques. Systems, computer-implemented methods and/or computer program products providing performance of these processes are of great utility in the fields of quantum circuit operation and/or quantum computing more generally and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively automatically perform quantum circuit encoding, load a quantum register, perform quantum calculations, generate a waveform and/or measure a state of qubit as the one or more embodiments described herein can provide these processes. Moreover, neither can the human mind nor a human with pen and paper conduct one or more of these processes, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

To provide additional summary, a listing of embodiments and features thereof is next provided.

A system, comprising: a memory that stores computer executable components; and a processor that executes the computer executable components stored in the memory, wherein the computer executable components comprise: an execution component that directs execution, employing a quantum processor, of an error mitigation set of quantum circuits that were noise-adjusted by employing noise scaling; and an evaluation component that evaluates, at an evaluation, results of the execution of the error mitigation set of quantum circuits, wherein the evaluation comprises a first generation of a first average expectation value corresponding to a noise-attenuated result of the execution, and wherein the evaluation further comprises a second generation of a second average expectation value corresponding to a noise-amplified result of the same execution.

The system of the preceding paragraph, wherein the first generation comprises generating the first average expectation value of all of the results of the execution of the error mitigation set of quantum circuits, and wherein the second generation comprises generating the second average expectation value of a remaining subset of all of the results of the execution of the quantum circuits of the error mitigation set, wherein the remaining subset comprises a result of negation of a sum of a first portion of the results of the execution of the error mitigation set of quantum circuits from a sum of a second portion of the results of the execution of the error mitigation set of quantum circuits.

The system of any preceding paragraph, wherein the first portion and the second portion together comprise all of the results of the execution of the quantum circuits of the error mitigation set.

The system of any preceding paragraph, further comprising: an error mitigation component that performs the noise scaling to attenuate noise in a set of quantum circuits, resulting in the error mitigation set of quantum circuits.

The system of any preceding paragraph, wherein, prior to the execution by the execution component, as a result of the noise scaling, an odd number of local errors are added to each quantum circuit corresponding to the first portion of the results, and an even number of local errors are added to each quantum circuit corresponding to the second portion of the results.

The system of any preceding paragraph, wherein the evaluation component further performs additional generations of average expectation values for noise gains other than those corresponding to the first generation or the second generation.

The system of any preceding paragraph, wherein the evaluation component automatically evaluates and automatically generates each of the first average expectation value and the second average expectation value in response to obtaining a full set of the results of the execution of the error mitigation set of quantum circuits.

The system of any preceding paragraph, further comprising: a fitting component that performs zero-noise extrapolation using the first average expectation value and the second average expectation value, and which fits results of the zero-noise extrapolation to a selected functional model.

A computer-implemented method, comprising: directing, by a system operatively coupled to a processor, execution, employing a quantum processor, of an error mitigation set of quantum circuits that were noise-adjusted by employing noise scaling; and evaluating, by the system, results of the execution of the error mitigation set of quantum circuits, wherein the evaluating comprises a first generation of a first average expectation value corresponding to a noise-attenuated result of the execution, and wherein the evaluating comprises a second generation of a second average expectation value corresponding to a noise-amplified result of the same execution.

The computer-implemented method of the preceding paragraph, wherein the first generation comprises generating, by the system, the first average expectation value of all of the results of the execution of the error mitigation set of quantum circuits, and wherein the second generation comprises generating, by the system, the second average expectation value of a remaining subset of all of the results of the execution of the quantum circuits of the error mitigation set, wherein the remaining subset comprises a result of negation of a sum of a first portion of the results of the execution of the error mitigation set of quantum circuits from a sum of a second portion of the results of the execution of the error mitigation set of quantum circuits.

The computer-implemented method of any preceding paragraph, wherein the first portion and the second portion together comprise all of the results of the execution of the quantum circuits of the error mitigation set.

The computer-implemented method of any preceding paragraph, further comprising: prior to the execution of the error mitigation set of quantum circuits, as a result of the noise scaling, adding, by the system, an odd number of local errors to each quantum circuit corresponding to the first portion of the results; and adding, by the system, an even number of local errors to each quantum circuit corresponding to the second portion of the results.

The computer-implemented method of any preceding paragraph, further comprising: performing, by the system, the noise scaling to attenuate noise in a set of quantum circuits, resulting in the error mitigation set of quantum circuits.

The computer-implemented method of any preceding paragraph, further comprising: automatically evaluating and automatically generating, by the system, each of the first average expectation value and the second average expectation value in response to obtaining a full set of the results of the execution of the error mitigation set of quantum circuits.

A computer program product facilitating a process to generate noise-attenuated and noise-amplified expectation value results from a same error mitigation set of quantum circuits, the computer program product comprising a computer readable storage medium having program instructions embodied therewith, the program instructions executable by a processor to cause the processor to: direct, by the processor, execution, employing a quantum processor, of an error mitigation set of quantum circuits that were noise-adjusted by employing noise scaling; and evaluate, by the processor, results of the execution of the error mitigation set of quantum circuits, wherein the evaluating comprises a first generation of a first average expectation value corresponding to a noise-attenuated result of the execution, and wherein the evaluating comprises a second generation of a second average expectation value corresponding to a noise-amplified result of the same execution.

The computer program product of the preceding paragraph, wherein the program instructions are further executable by the processor to cause the processor to: for the first generation, generate, by the processor, the first average expectation value of all of the results of the execution of the error mitigation set of quantum circuits, and for the second generation, generate, by the processor, the second average expectation value of a remaining subset of all of the results of the execution of the quantum circuits of the error mitigation set, wherein the remaining subset comprises a result of negation of a sum of a first portion of the results of the execution of the error mitigation set of quantum circuits from a sum of a second portion of the results of the execution of the error mitigation set of quantum circuits.

The computer program product of any preceding paragraph, wherein the first portion and the second portion together comprise all of the results of the execution of the quantum circuits of the error mitigation set.

The computer program product of any preceding paragraph, wherein the program instructions are further executable by the processor to cause the processor to: prior to the execution of the error mitigation set of quantum circuits, as a result of the noise scaling, add, by the processor, an odd number of local errors to each quantum circuit corresponding to the first portion of the results; and add, by the processor, an even number of local errors to each quantum circuit corresponding to the second portion of the results.

The computer program product of any preceding paragraph, wherein the program instructions are further executable by the processor to cause the processor to: perform, by the processor, the noise scaling to attenuate noise in a set of quantum circuits, resulting in the error mitigation set of quantum circuits.

The computer program product of any preceding paragraph, wherein the program instructions are further executable by the processor to cause the processor to: automatically evaluate and automatically generate, by the processor, each of the first average expectation value and the second average expectation value in response to obtaining a full set of the results of the execution of the error mitigation set of quantum circuits.

Computing Environment Description

Turning next to FIG. 10, a detailed description is provided of additional context for the one or more embodiments described herein at FIGS. 1-9.

FIG. 10 and the following discussion are intended to provide a brief, general description of a suitable computing environment 1000 in which one or more embodiments described herein at FIGS. 1-9 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as translation of an original source code based on a configuration of a target system by the quantum error mitigation code 1080. In addition to block 1080, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1080, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1080 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid-state storage devices. Operating system 1022 may take several forms, such as various known proprietary operating systems or open-source Portable Operating System Interface type operating systems that employ a kernel. The code included in block 1080 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001) and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine that collects and stores helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044.

It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

Additional Closing Information

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:
1. A system, comprising:
   a memory that stores computer executable components; and a processor that executes the computer executable components stored in the memory, wherein the computer executable components comprise:
  an execution component that directs execution, employing a quantum processor, of an error mitigation set of quantum circuits that were noise-adjusted by employing noise scaling; and
  an evaluation component that evaluates, at an evaluation, results of the execution of the error mitigation set of quantum circuits,
    wherein the evaluation comprises a first generation of a first average expectation value corresponding to a noise-attenuated result of the execution, and
    wherein the evaluation further comprises a second generation of a second average expectation value corresponding to a noise-amplified result of the same execution.

2. The system of claim 1, wherein the first generation comprises generating the first average expectation value of all of the results of the execution of the error mitigation set of quantum circuits, and
  wherein the second generation comprises generating the second average expectation value of a remaining subset of all of the results of the execution of the quantum circuits of the error mitigation set, wherein the remaining subset comprises a result of negation of a sum of a first portion of the results of the execution of the error mitigation set of quantum circuits from a sum of a second portion of the results of the execution of the error mitigation set of quantum circuits.

3. The system of claim 2, wherein the first portion and the second portion together comprise all of the results of the execution of the quantum circuits of the error mitigation set.

4. The system of claim 2, further comprising:
  an error mitigation component that performs the noise scaling to attenuate noise in a set of quantum circuits, resulting in the error mitigation set of quantum circuits.

5. The system of claim 2, wherein, prior to the execution by the execution component, as a result of the noise scaling, an odd number of local errors are added to each quantum circuit corresponding to the first portion of the results, and an even number of local errors are added to each quantum circuit corresponding to the second portion of the results.

6. The system of claim 1, wherein the evaluation component further performs additional generations of average expectation values for noise gains other than those corresponding to the first generation or the second generation.

7. The system of claim 1, wherein the evaluation component automatically evaluates and automatically generates each of the first average expectation value and the second average expectation value in response to obtaining a full set of the results of the execution of the error mitigation set of quantum circuits.

8. The system of claim 1, further comprising:
  a fitting component that performs zero-noise extrapolation using the first average expectation value and the second average expectation value, and which fits results of the zero-noise extrapolation to a selected functional model.

9. A computer-implemented method, comprising:
  directing, by a system operatively coupled to a processor, execution, employing a quantum processor, of an error mitigation set of quantum circuits that were noise-adjusted by employing noise scaling; and
  evaluating, by the system, results of the execution of the error mitigation set of quantum circuits,
    wherein the evaluating comprises a first generation of a first average expectation value corresponding to a noise-attenuated result of the execution, and
    wherein the evaluating comprises a second generation of a second average expectation value corresponding to a noise-amplified result of the execution.

10. The computer-implemented method of claim 9, wherein the first generation comprises generating, by the system, the first average expectation value of all of the results of the execution of the error mitigation set of quantum circuits, and
  wherein the second generation comprises generating, by the system, the second average expectation value of a remaining subset of all of the results of the execution of the quantum circuits of the error mitigation set, wherein the remaining subset comprises a result of negation of a sum of a first portion of the results of the execution of the error mitigation set of quantum circuits from a sum of a second portion of the results of the execution of the error mitigation set of quantum circuits.

11. The computer-implemented method of claim 10, wherein the first portion and the second portion together comprise all of the results of the execution of the quantum circuits of the error mitigation set.

12. The computer-implemented method of claim 10, further comprising:
  prior to the execution of the error mitigation set of quantum circuits, as a result of the noise scaling, adding, by the system, an odd number of local errors to each quantum circuit corresponding to the first portion of the results; and
  adding, by the system, an even number of local errors to each quantum circuit corresponding to the second portion of the results.

13. The computer-implemented method of claim 9, further comprising:
  performing, by the system, the noise scaling to attenuate noise in a set of quantum circuits, resulting in the error mitigation set of quantum circuits.

14. The computer-implemented method of claim 9, further comprising:
  automatically evaluating and automatically generating, by the system, each of the first average expectation value and the second average expectation value in response to obtaining a full set of the results of the execution of the error mitigation set of quantum circuits.

15. A computer program product facilitating a process to generate noise-attenuated and noise-amplified expectation value results from a same error mitigation set of quantum circuits, the computer program product comprising a non-transitory computer readable medium having program instructions embodied therewith, the program instructions executable by a processor to cause the processor to:
  direct, by the processor, execution, employing a quantum processor, of an error mitigation set of quantum circuits that were noise-adjusted by employing noise scaling; and
  evaluate, by the processor, results of the execution of the error mitigation set of quantum circuits,
    wherein the evaluating comprises a first generation of a first average expectation value corresponding to a noise-attenuated result of the execution, and
    wherein the evaluating comprises a second generation of a second average expectation value corresponding to a noise-amplified result of the execution.

16. The computer program product of claim 15, wherein the program instructions are further executable by the processor to cause the processor to:
  for the first generation, generate, by the processor, the first average expectation value of all of the results of the execution of the error mitigation set of quantum circuits, and
  for the second generation, generate, by the processor, the second average expectation value of a remaining subset of all of the results of the execution of the quantum circuits of the error mitigation set, wherein the remaining subset comprises a result of negation of a sum of a first portion of the results of the execution of the error mitigation set of quantum circuits from a sum of a second portion of the results of the execution of the error mitigation set of quantum circuits.

17. The computer program product of claim 16, wherein the first portion and the second portion together comprise all of the results of the execution of the quantum circuits of the error mitigation set.

18. The computer program product of claim 16, wherein the program instructions are further executable by the processor to cause the processor to:
  prior to the execution of the error mitigation set of quantum circuits, as a result of the noise scaling, add, by the processor, an odd number of local errors to each quantum circuit corresponding to the first portion of the results; and
  add, by the processor, an even number of local errors to each quantum circuit corresponding to the second portion of the results.

19. The computer program product of claim 15, wherein the program instructions are further executable by the processor to cause the processor to:
  perform, by the processor, the noise scaling to attenuate noise in a set of quantum circuits, resulting in the error mitigation set of quantum circuits.

20. The computer program product of claim 15, wherein the program instructions are further executable by the processor to cause the processor to:
  automatically evaluate and automatically generate, by the processor, each of the first average expectation value and the second average expectation value in response to obtaining a full set of the results of the execution of the error mitigation set of quantum circuits.

* * * * *